United States Patent
Zhou et al.

(10) Patent No.: US 6,243,200 B1
(45) Date of Patent: Jun. 5, 2001

(54) OPTICAL WAVELENGTH ROUTER BASED ON POLARIZATION INTERFEROMETER

(75) Inventors: Gan Zhou; Kuang-Yi Wu, both of Plano, TX (US)

(73) Assignee: Chorum Technologies, Inc., Richardson, TX (US)

( * ) Notice: Subject to any disclaimer, the term of this patent is extended or adjusted under 35 U.S.C. 154(b) by 0 days.

(21) Appl. No.: 09/547,812

(22) Filed: Apr. 11, 2000

Related U.S. Application Data

(60) Provisional application No. 60/186,314, filed on Mar. 2, 2000.

(51) Int. Cl.[7] .............................. G02B 5/30; H04J 14/02; H04J 14/06
(52) U.S. Cl. .................. 359/497; 359/495; 359/487; 359/900; 359/122; 359/124
(58) Field of Search ................... 359/115, 122, 359/124, 487, 495, 497, 900; 372/94, 99, 105; 356/484, 487, 49

(56) References Cited

U.S. PATENT DOCUMENTS

| | | | |
|---|---|---|---|
| 4,006,426 | * 2/1977 | Lacour | 359/497 |
| 4,919,522 | 4/1990 | Nelson . | |
| 4,950,078 | * 8/1990 | Sommargren . | |
| 5,136,671 | 8/1992 | Dragone . | |
| 5,155,623 | * 10/1992 | Miller et al. | 359/495 |
| 5,363,228 | 11/1994 | DeJule et al. . | |
| 5,381,250 | 1/1995 | Meadows . | |
| 5,414,541 | 5/1995 | Patel et al. . | |
| 5,488,500 | 1/1996 | Glance . | |
| 5,546,219 | * 8/1996 | Iida | 359/495 |

(List continued on next page.)

OTHER PUBLICATIONS

Ammann, "Synthesis of Electro–Optic Shutters having a Prescribed Transmission vs Voltage Characteristic", Journal of the Optical Society of America (vol. 56, No. 8, pp. 1081–1088, Aug. 1966).

Harris et al., "Optical Network Synthesis Using Birefringent Crystals. *I. Synthesis of Lossless Networks of Equal–Length Crystals", Journal of the Optical Society of America (vol. 54, No. 10, pp. 1267–1279, Oct. 1964).

(List continued on next page.)

*Primary Examiner*—Ricky D. Shafer
(74) *Attorney, Agent, or Firm*—Dorr, Carson, Sloan & Birney, P.C.

(57) ABSTRACT

A method and apparatus for optical wavelength routing separates even and odd optical channels from an input WDM signal. The input beam is first converted to at least one pair of orthogonally-polarized beams. A split-mirror resonator has a front mirror with two regions having different reflectivities, and a reflective back mirror spaced a predetermined distance behind the front mirror. Each of the orthogonally-polarized beams is incident on a corresponding region of the front mirror of the split-mirror resonator. A portion of each beam is reflected by the front mirror, while the remainder of each beam enters the resonator cavity where it is reflected by the back mirror back through the front mirror. The group delay of each reflected beam is strongly dependent on wavelength. The two reflected beams from the resonator are combined and interfere in a birefringent element (e.g., a beam displacer or waveplates) to produce a beam having mixed polarization as a function of wavelength. The polarized components of this beam are separated by a polarization-dependent routing element (e.g., a polarized beamsplitter) to produce two output beams containing complementary subsets of the input optical spectrum (e.g., even optical channels are routed to output port A and odd optical channels are routed to output port B).

23 Claims, 9 Drawing Sheets

U.S. PATENT DOCUMENTS

| | | | | |
|---|---|---|---|---|
| 5,574,595 | * | 11/1996 | Kurata et al. | 359/487 |
| 5,596,661 | | 1/1997 | Henry et al. . | |
| 5,606,439 | | 2/1997 | Wu . | |
| 5,680,490 | | 10/1997 | Cohen et al. . | |
| 5,689,360 | * | 11/1997 | Kurata et al. | 359/487 |
| 5,694,233 | | 12/1997 | Wu et al. . | |
| 5,768,005 | * | 6/1998 | Cheng et al. | 359/497 |
| 5,809,190 | | 9/1998 | Chen . | |
| 5,818,626 | * | 10/1998 | Engstrom et al. | 359/487 |

OTHER PUBLICATIONS

Senior et al., "Devices for Wavelength Multiplexing and Demultiplexing", IEE Proceedings (vol. 136, Pt. J, No. 3, Jun. 1989).

Nosu et al., "Optical FDM Transmission Technique", Journal of Lightwave Technology (vol. LT–5, No. 9, Sep. 1987).

Inoue et al., "A Four–Channel Optical Waveguide Multi/Demultiplexer for 5–GHz Spaced Optical FDM Transmission", Journal of Lightwave Technology (vol. 6, No. 2, Feb. 1988).

Chung et al., "Analysis of a Tunable Multichannel Two–Mode–Interference Wavelength Division Multiplexer/Demultiplexer", Journal of Lightwave Technology (vol. 7, No. 5, May 1989).

Demask et al., "Wavelength–Division Multiplexing using Channel–Dropping Filters", Journal of Lightwave Technology (vol. 11, No. 3, Mar. 1993).

Dingel and Izutsu, (Multifunction Optical Filter with a Michelson–Gires–Tournois Interferometer for Wavelength–Division–Multiplexed Network System Applications, Optical Letters (vol. 23, p. 1099, Jul. 1998).

* cited by examiner

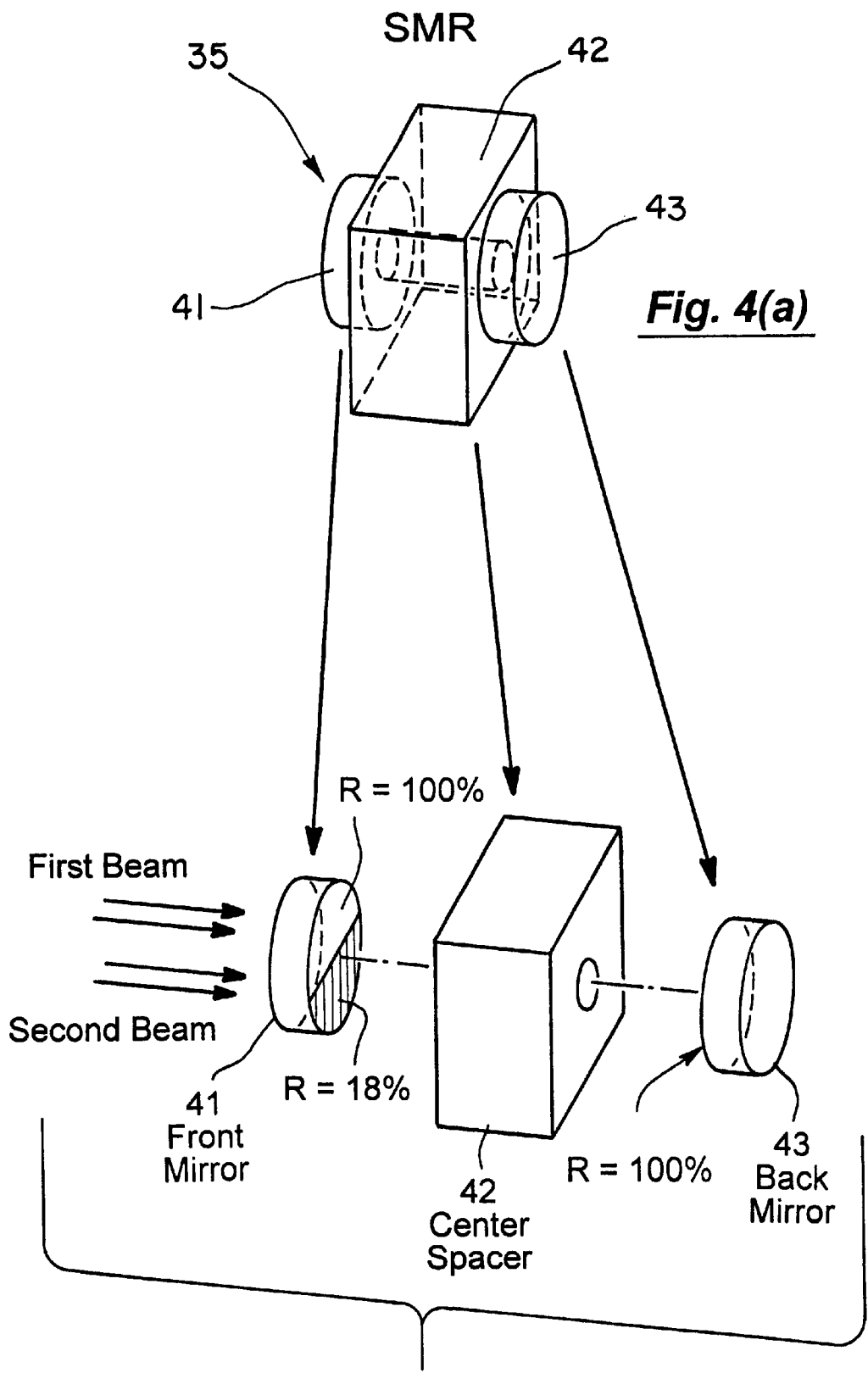

OPTICAL WAVELENGTH ROUTER BASED ON POLARIZATION INTERFEROMETER

RELATED APPLICATION

The present application is based on the Applicants' U.S. Provisional Patent Application Ser. No. 60/186,314, filed on Mar. 2, 2000, entitled "Optical Wavelength Router Based On Polarization Interferometer."

BACKGROUND OF THE INVENTION

1. Field of the Invention

The present invention relates generally to the field of optical communications systems. More specifically, the present invention discloses an optical wavelength router for wavelength division multiplex (WDM) optical communications.

2. Statement of the Problem

Wavelength division multiplexing is a commonly used technique that allows the transport of multiple optical signals, each at a slightly different wavelength, on an optical fiber. The ability to carry multiple signals on a single fiber allows that fiber to carry a tremendous amount of traffic, including data, voice, and even digital video signals. As an example, the use of wavelength division multiplexing permits a long distance telephone company to carry thousands or even millions of phone conversations on one fiber. By using wavelength division multiplexing, it is possible to effectively use the fiber at multiple wavelengths, as opposed to the costly process of installing additional fibers.

In wavelength division multiplexing techniques, multiple wavelengths can be carried within a specified bandwidth. It is advantageous to carry as many wavelengths as possible in that bandwidth. International Telecommunications Union (ITU) Draft Recommendation G.mcs, incorporated herein by reference, proposes a frequency grid which specifies various channel spacings including 100 GHz and 200 GHz. It would be advantageous to obtain 50 GHz spacing. Separating and combining wavelengths with these close spacings requires optical components which have high peak transmission at the specified wavelengths and which can provide good isolation between separated wavelengths.

One technique which has been developed to accomplish the demultiplexing of closely spaced wavelengths is to cascade a series of wavelength division demultiplexing devices, each device having different wavelength separating characteristics. A typical application involves cascading an interferometric device such as an arrayed waveguide device having a narrow spacing of transmission peaks (e.g., 50 GHz) with a second interferometric device which has a coarser spacing and correspondingly broader transmission peaks (e.g., 100 GHz spacing). The cascade of devices provides the separation of wavelengths by subdividing the wavelengths once in the first device, typically into a set of odd and even channels, and then separating wavelengths in the subsets in following devices in the cascade.

Arrayed waveguide, fused biconical taper, fiber Bragg grating, diffraction grating, and other interferometric wavelength demultiplexing devices can be constructed to have the appropriate characteristics for the first or second stage devices in the cascade. However, traditional interferometric devices have the characteristic that as the spacing of the channels is decreased, the transmission peaks become narrower, and are less flat over the wavelength region in the immediate vicinity of each peak than a device with wider channel spacings. As a result, when using a traditional device in the first stage of a cascade, the transmission peaks may not have a high degree of flatness, and any drift or offset of a wavelength from its specified value may result in significant attenuation of that wavelength. In addition, the isolation between wavelengths is frequently unsuitable with conventional interferometric devices and can result in unacceptable cross-talk between channels.

With increasing numbers of wavelengths and the close wavelength spacing which is utilized in dense wavelength division multiplexing systems, attenuation and cross-talk must be closely controlled to meet the system requirements and maintain reliable operations. As an example, 40 or 80 wavelengths can be generated using controllable wavelength lasers, with transmission signals modulated onto each laser. It is desirable to be able to demultiplex these channels. Although the lasers can be controlled and the wavelengths stabilized to prevent one channel from drifting into another, there is always some wavelength drift which will occur.

For the foregoing reasons, there is a need for a wavelength division demultiplexing device which tolerates wavelength drift, maintains a high degree of isolation between channels, and is able to separate large numbers of wavelengths.

3. Prior Art

FIG. 1 illustrates a prior art interferometer that shares some of the basic principles employed in the present invention. An input laser beam is split into two beams by a beamsplitter 10. One beam propagates toward a mirror 14 and is reflected back by this mirror. The other beam propagates toward a resonator 12 and is also reflected back. The resonator 12 is a Fabry-Perot cavity with a partially-reflective front mirror and a totally-reflective back mirror. The resonator 12 reflects substantially all of the incident optical power back regardless of wavelength, but the group delay of the reflected light is strongly dependent on wavelength. The two reflected beams from the mirror 14 and from the resonator 12 interfere at the beamsplitter 10 and the resulting output is split into two beams, one at output A, and the other in a different direction at output B. The two output beams contain complementary subsets of the input optical spectrum, as shown for example in FIG. 2. Such a wavelength router concept has been proposed by B. B. Dingle and M. Izutsu, "Multifunction Optical Filter With A Michelson-Gires-Tournois Interferometer For Wavelength-Division-Multiplexed Network System Applications," *Optics Letters*, vol. 23, p.1099 (1998) and the references therein.

The two output ports A and B divide the spectral space evenly with alternating optical channels being directed to each output port (i.e., optical channels 1, 3, 5, 7, etc. are directed to output port A, while channels 2, 4, 6, etc. are directed to output port B). This function has sometimes been called an optical interleaver.

4. Solution to the Problem

The present invention address the problems associated with the prior art using a polarization-based interferometer to implement an optical interleaver capable of separating closely spaced optical channels with minimal cross-talk.

SUMMARY OF THE INVENTION

This invention provides a method and apparatus for optical wavelength routing in which an input beam is converted to at least one pair of orthogonally-polarized beams. A split-mirror resonator has a front mirror with two regions having different reflectivities, and a reflective back mirror spaced a predetermined distance behind the front mirror. Each of the orthogonally-polarized beams is incident on a corresponding region of the front mirror of the resonator. A portion of each beam is reflected by the front mirror, while the remainder of each beam enters the resonator cavity where it is reflected by the back mirror back through the front mirror. The group delay of each reflected beam is strongly dependent on wavelength. The two reflected beams from the resonator are combined and interfere in a birefringent element (e.g., a beam displacer or waveplates) to produce a beam having mixed polarization as a function of wavelength. The polarized components of this beam are separated by a polarization-dependent routing element (e.g., a polarized beamsplitter) to produce two output beams containing complementary subsets of the input optical spectrum (e.g., even optical channels are routed to output port A and odd optical channels are routed to output port B).

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 4(a) is a detail perspective view of the split-mirror resonator in FIG. 3.

FIG. 4(b) is an exploded view of the components of the split-mirror resonator corresponding to FIG. 4(a).

DETAILED DESCRIPTION OF THE INVENTION

Figure 3:
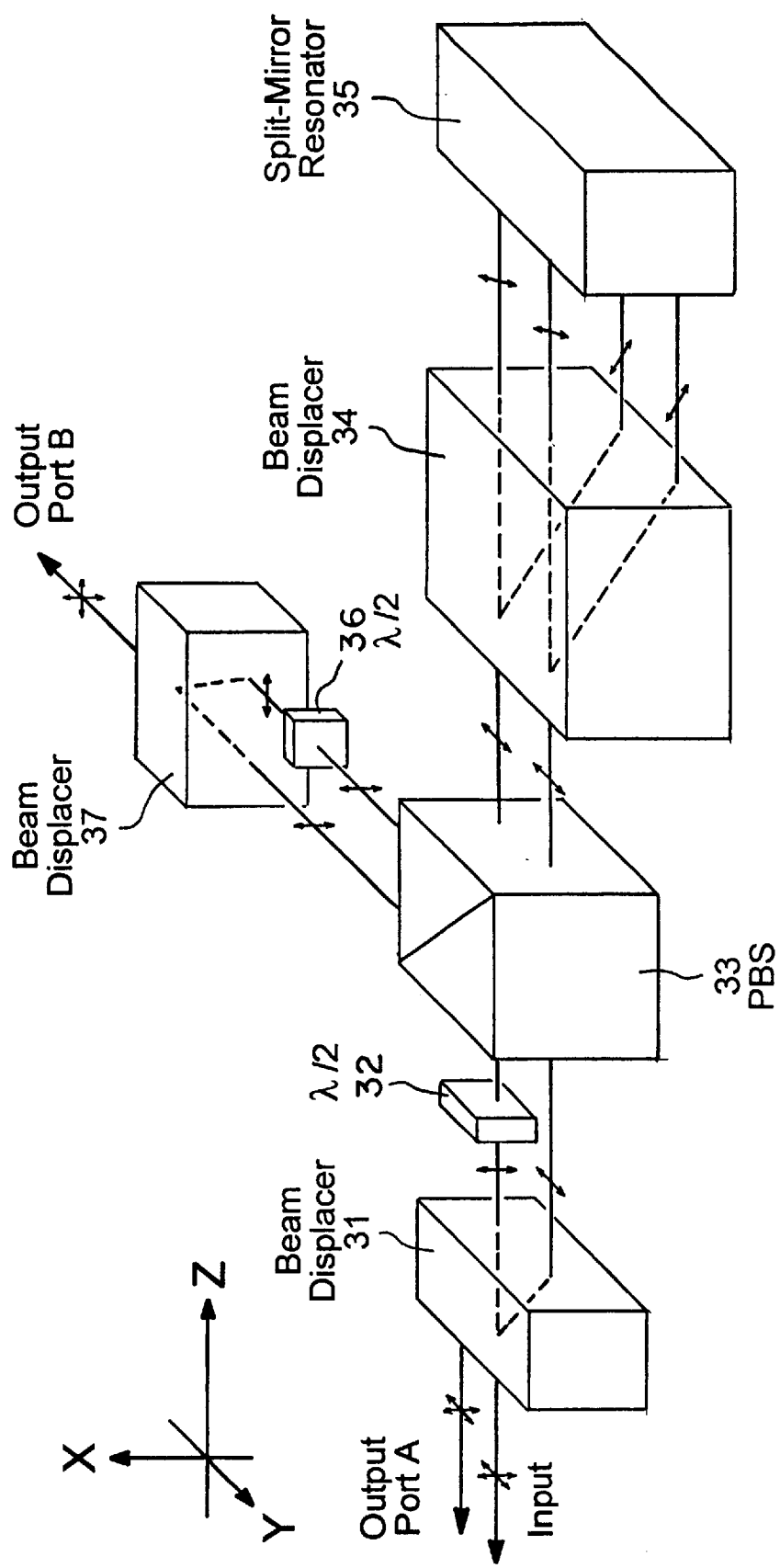
FIG. 3 is a diagram of an optical wavelength router embodying the present invention.

FIG. 3 is a diagram showing a one possible implementation of the present optical wavelength router based on a polarization interferometer. A collimated beam from an optical fiber propagates along the Z axis and is incident into the first beam displacer 31. For example, a birefringent element consisting of a material such as calcite, rutile, lithium niobate, $YVO_4$-based crystals, and the like could be used as the beam displacers in the present invention. The first beam displacer 31 splits the input beam into two beams having orthogonal polarizations (e.g., along the X and Y directions, respectively). A half-wave plate ($\lambda/2$) 32 rotates the polarization of one of these beams by 90 degrees, so that both beams have the same polarization. For example, both beams exiting the half-wave plate 32 in FIG. 3 are polarized along the Y axis.

Both beams then pass through a polarized beamsplitter (PBS) 33 without significant attenuation. A second beam displacer 34 splits the Y-polarized beam pair into two pairs of beams that are orthogonally polarized in the XY plane. One pair of these beams is polarized at 45 degrees relative to the X axis, while the other pair is polarized at 135 degrees relative to the X axis. The two pairs of beams are incident onto and reflected by a split-mirror resonator (SMR) 35.

FIGS. 4(a) and 4(b) show the structure of the split mirror resonator 35 in FIG. 3. The resonator 35 is formed by a front mirror 41 and a back mirror 43 separated a predetermined distance by a center spacer 42. The front mirror 41 is a split mirror in which part of the surface is coated with a high-reflectivity coating and part of the surface is only partially reflective (e.g., 18% reflectivity). The degree of reflectivity of both regions is a matter of design. For example, the high-reflectivity region can be 100% reflective, or only partially reflective so long as it is more reflective than the other region of the front mirror 41. For example, this can be accomplished by applying a split coating to the front mirror 41. The second mirror 43 has a high reflectivity.

Returning to FIG. 3, the second beam displacer 34 produces two pairs of orthogonally-polarized beams. The first beam pair strikes the highly-reflective region of the front mirror 41 and is largely reflected back along the Z axis to the second beam displacer 34 without propagating through the resonator 35. In contrast, the second beam pair strikes the partially-reflective region of the front mirror 41 and is partially transmitted through the front mirror 41 into the resonator cavity between the front and back mirrors 41 and 43. A portion of the second beam pair is also reflected back along the Z axis to the second beam displacer 34 without propagating through the resonator 35. The transmitted portions of the first and second beam pairs are reflected by the back mirror 43 through the front mirror 41 of the resonator 35 toward the second beam displacer 34. The split-mirror resonator 35 reflects substantially all of the incident optical power back regardless of wavelength, but the group delay of the reflected beams is strongly dependent on wavelength.

Thus, both pairs of reflected beams from the split mirror resonator 35 back-propagate along the negative Z axis (moving toward the left in FIG. 3) and are recombined into one pair of beams by the second beam displacer 34. Due to the birefringence of the second beam displacer 34, a difference in the optical path lengths between the two beam pairs is generated. As a result, the polarization state of the back-propagating beam pair exiting the second beam displacer 34 is a function of optical wavelength. In other words, this back-propagating beam pair has mixed polarization as a function of the optical wavelengths carried by the beams.

The back-propagating beam pair enters the polarized beamsplitter 33. The components of the beam pair that are polarized along the Y axis are transmitted through the polarized beamsplitter 33 toward the first beam displacer 31, while those components that are polarized along the X axis are reflected by the polarized beamsplitter 33 toward a third beam displacer 37, as illustrated in FIG. 3. It should be expressly understood that other types of polarization-dependent routing elements could be employed to separate the components of the back-propagating beam pair. For example, an angled beamsplitter, beam displacer, or other birefringent element could substituted for this purpose.

One of the beams in the transmitted beam pair passes through the half-wave plate 32 which rotates its polarization by 90 degrees, so that the transmitted beams have orthogonal polarizations. These beams are then recombined by the first beam displacer 31 into a single beam at output port A. Similarly, one of the beams in the reflected beam pair passes through a half-wave plate 36 which rotates its polarization by 90 degrees, so that the reflected beams become orthogonally polarized. These beams are recombined by the third beam displacer 37 into a single beam at output port B.

Figure 1:
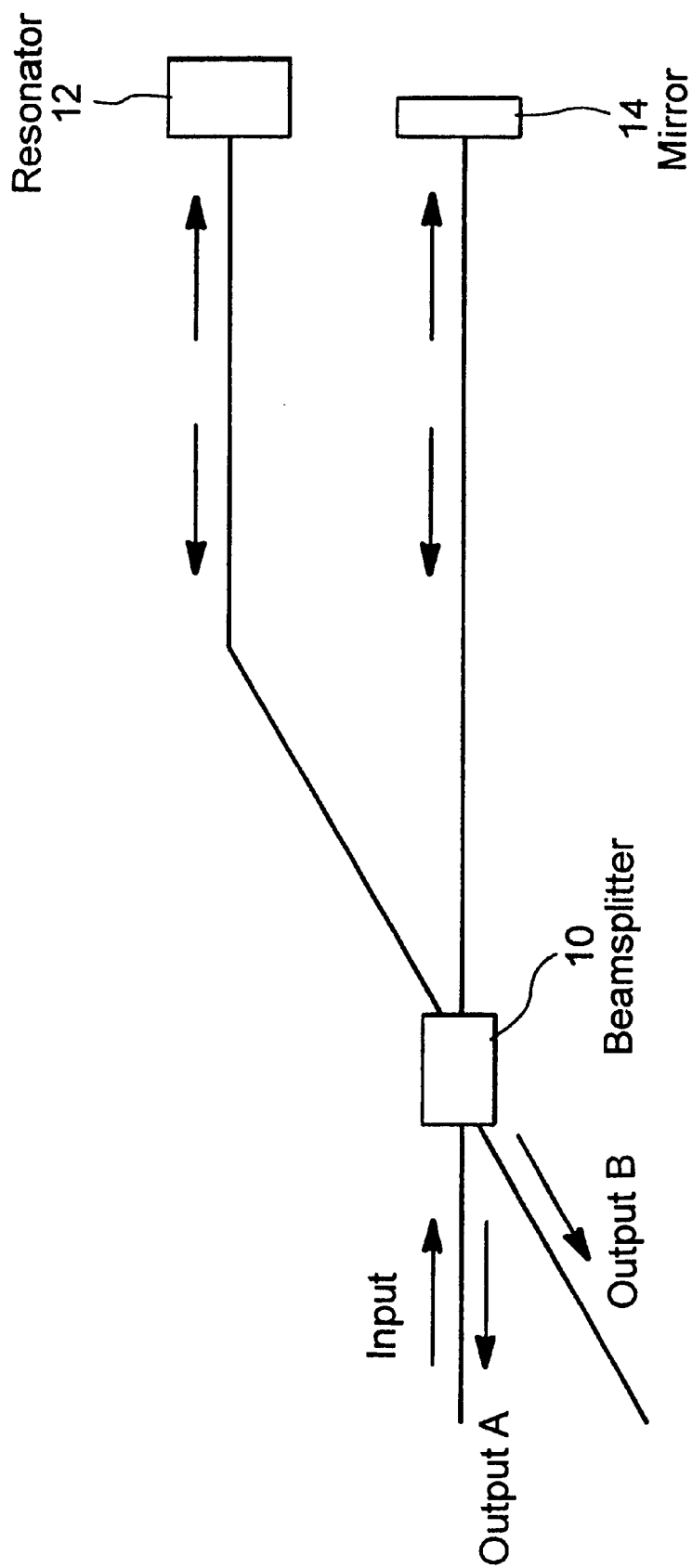
FIG. 1 is a simplified diagram of a prior art interferometer using a beamsplitter and a Fabry-Perot cavity resonator.
Figure 2:
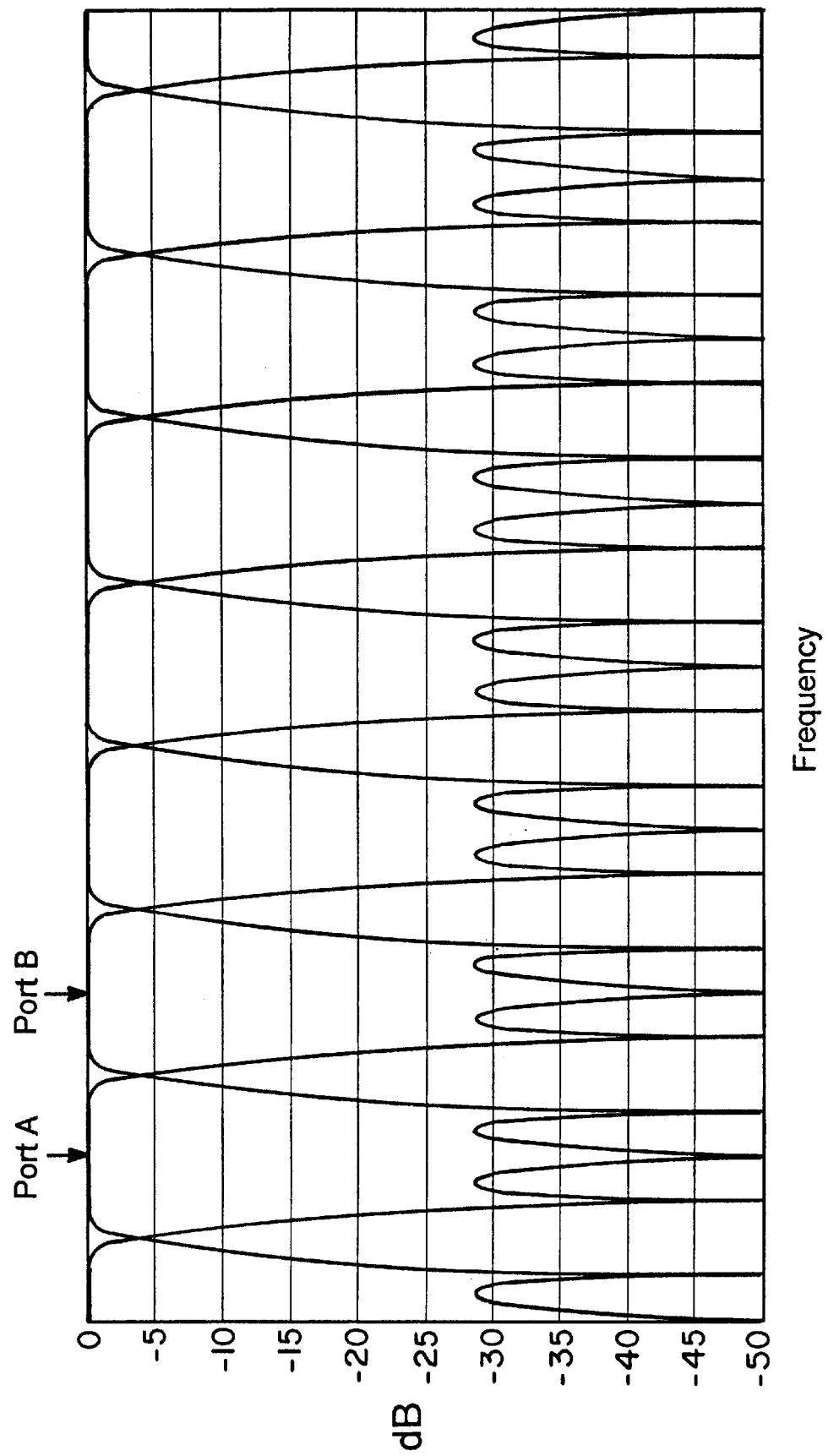
FIG. 2 is a graph showing an example of the spectral response of the interferometer in FIG. 1.

Thus, this device functions as an optical interleaver. The outputs beams at output ports A and B contain two complementary subsets of the input optical spectrum, similar to those shown in FIG. 2, with alternating optical channels in the input spectrum being routed to each output port. If desired, this device can be extended in a cascade architecture with multiple stages of optical interleavers to progressively separate individual channels or groups of channels.

The embodiment of the split-mirror resonator shown in FIGS. 4(a) and 4(b) has advantages in certain applications. This embodiment can decrease the device size. More importantly, it allows the two beam pairs to share a common path, thereby minimizing the effects of vibration, air turbulence, and temperature change.

Figure 5A:
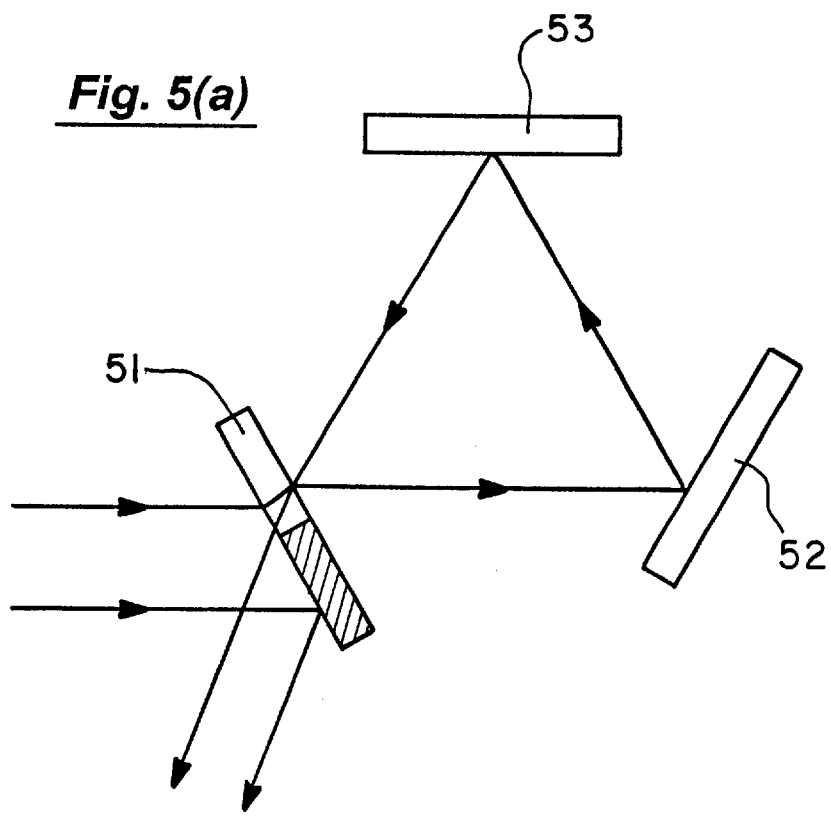
FIG. 5(a) is a diagram of an alternative embodiment of a split-mirror resonator using three mirrors in a ring configuration.
Figure 5B:
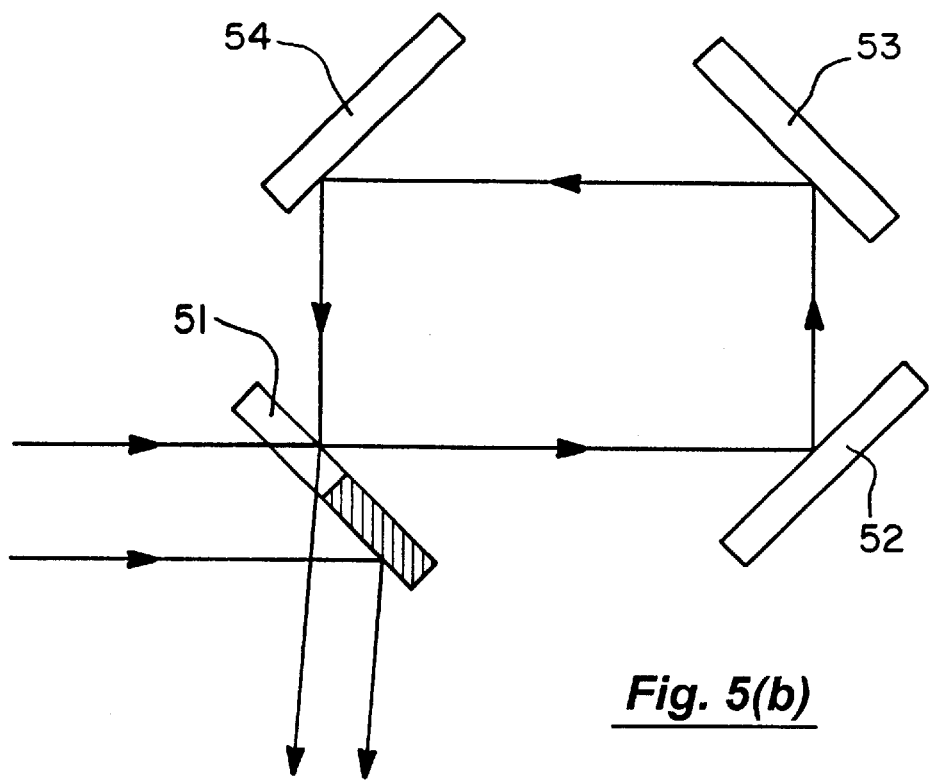
FIG. 5(b) is a diagram of another alterative embodiment of a split-mirror resonator using four mirrors in a ring configuration.

Ring-Shaped Resonator Structures. Alternatively, the split-mirror resonator can be implemented as a ring structure with more than two mirrors. For example, FIG. 5(a) shows a resonator with three mirrors 51, 52, and 53. Here, the first mirror 51 is a split mirror, similar to the example shown in FIG. 4 (b). The other mirrors 52 and 53 are coated with a high reflectance coating. FIG. 5(b) extends this concept to a resonator with four mirrors 51–54 in a ring structure.

Figure 6:
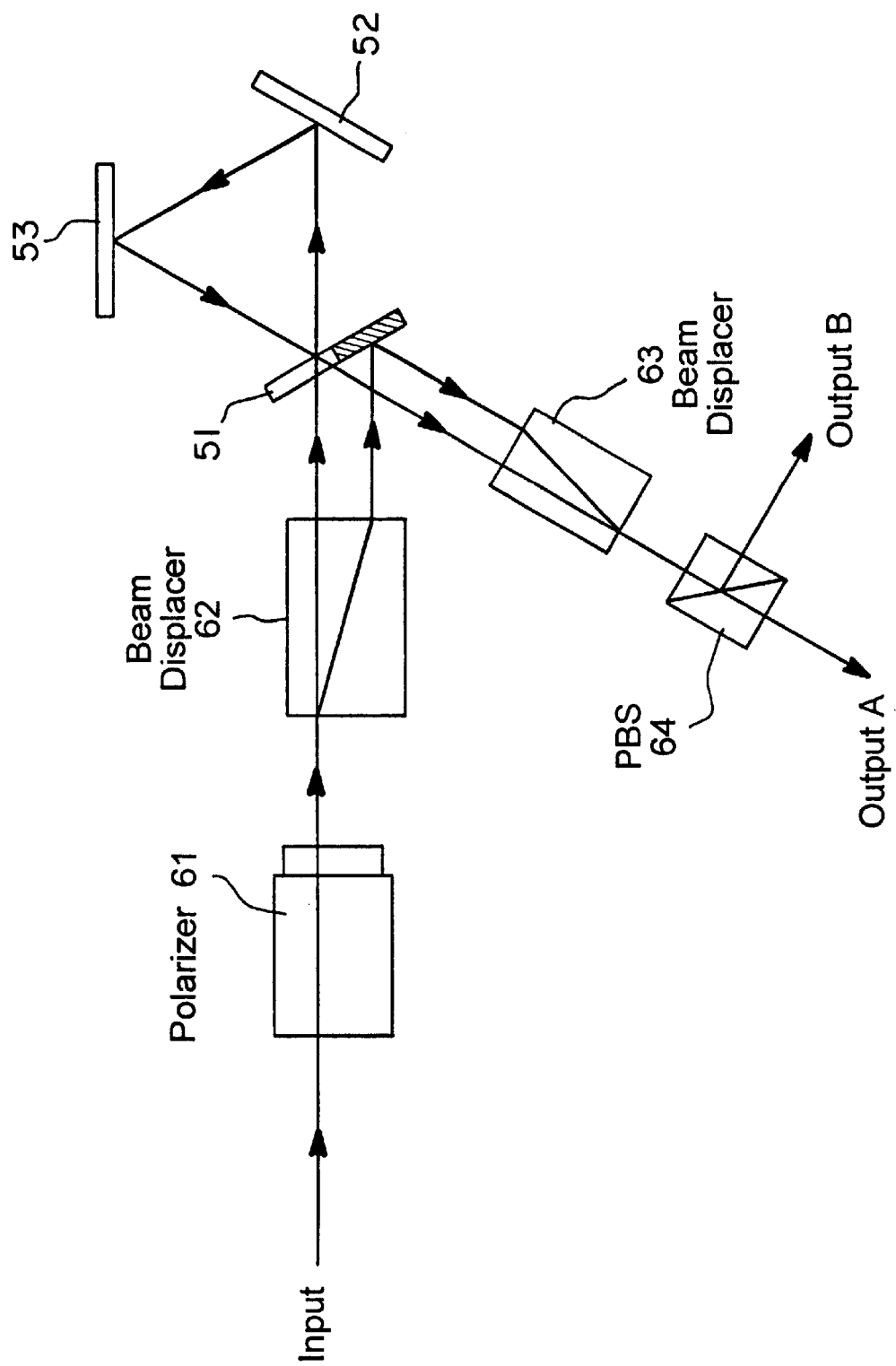
FIG. 6 is a diagram of an alternative embodiment of the optical wavelength router using the ring resonator from FIG. 5(a).

FIG. 6 shows an alternative embodiment of an optical wavelength router using the ring resonator structure from FIG. 5(a). The input optical signal passes through a polarizer 61 that converts the random polarization of the input beam to a known linear polarization. For example, the polarizer 61 can be implemented as a birefringent element 31 and half-wave plate 32 as shown in FIG. 3 that converts the input beam into a pair of beams having the same polarization. Alternatively a simple polarization filter can be employed to produce a single polarized beam as shown in FIG. 6.

The polarized beam is then separated into two orthogonally-polarized beams by a first beam displacer 62. As before, one of these beams strikes the highly reflective region of the first mirror 51 and is reflected to the second beam displacer 63. The other beam passes through the partially reflective region of the first mirror 51 and is reflected in turn by the second and third mirrors 52 and 53 before being reflected back through the first mirror 51 toward the second beam displacer 63. The beams exiting the ring resonator 51–53 are combined by the second beam displacer 63. Here, again, the difference in the optical path lengths between the beams due to the birefringence of the first beam displacer 62 and the second beam displacer 63 produces interference between the beams and results in an output beam having a polarization state that is a function of optical wavelength. A polarized beamsplitter 64 (or other polarization-dependent routing element) separates the polarized components of the output beam from the second beam displacer 63 to output ports A and B, respectively, to produce two complementary subsets of the input optical spectrum, similar to those shown in FIG. 2.

Figure 7:
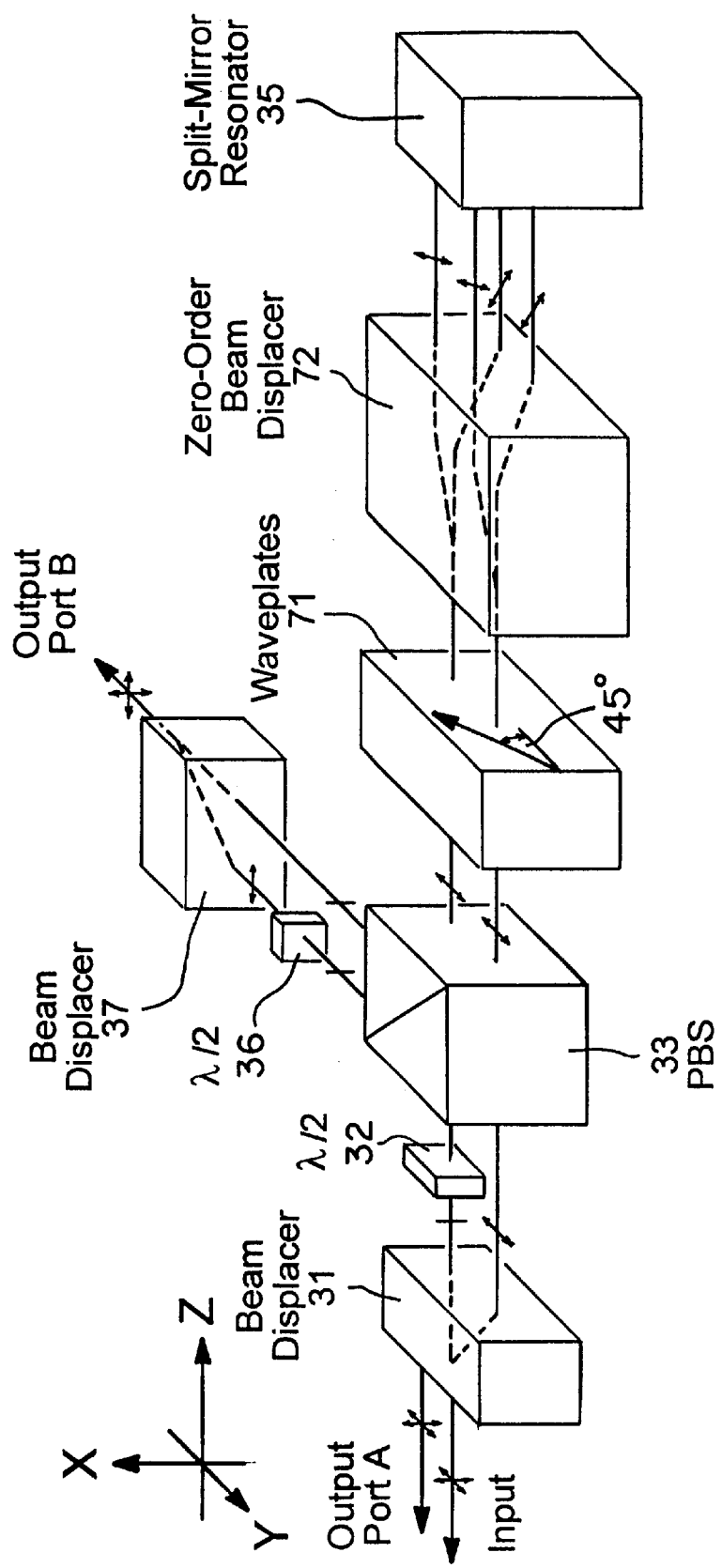
FIG. 7 is a diagram of another alternative embodiment of the optical wavelength router.

Wavelength Router Using Waveplates and a Zero-Order Beam Displacer. FIG. 7 shows another alternative embodiment of the present optical wavelength router. In this device, one or more waveplates 71 are used to generate birefringence and thereby produce a predetermined difference in the optical path lengths between different optical polarizations. The waveplates 71 are oriented such that the optical axis for each one is at 45 degrees relative to the polarizing axis of the beamsplitter 33. However, the waveplates 71 do not disturb the net beam propagation direction. The waveplates 71 can be one piece of birefringent material oriented at 45 degrees, or a plurality of birefringent elements that are all oriented at 45 degrees.

The first beam displacer 31 splits the input beam into two orthogonally-polarized beams. A half-wave plate 32 rotates the polarization of one of these beams by 90 degrees, so that both beams have the same polarization. Both beams then pass through a polarized beamsplitter 33 without significant attenuation. The waveplates 71 cause a 50/50 split of the incident optical power of both beams into two orthogonal polarizations as a result of the 45 degree orientation of the waveplates' axis. After the waveplates 71, a second beam displacer 72 spatially separates the two orthogonal polarizations in the beam pair to create two pairs of beams as illustrated in FIG. 7.

A split-mirror resonator 35, as describe above and shown in FIGS. 4(a) and 4(b), reflects both beams pairs beams back along the negative Z axis so that they are recombined into one pair of beams by the second beam displacer 72. Due to the birefringence of the waveplates 71, a difference in the optical path lengths between the orthogonally polarized beams is generated. As a result, the polarization state of the back-propagating beam pair exiting the waveplate 71 is a function of optical wavelength.

The back-propagating beam pair enters the polarized beamsplitter 33 (or other polarization-dependent routing element). The components of the beam pair that are polarized along the Y axis are transmitted through the polarized beamsplitter 33 toward the first beam displacer 31, while those components that are polarized along the X axis are reflected by the polarized beamsplitter 33 toward a third beam displacer 37. One of the beams in the transmitted beam pair passes through a half-wave plate 32 that rotates its polarization by 90 degrees, so that the transmitted beams have orthogonal polarizations. These beams are then recombined by the first beam displacer 31 into a single beam at output port A. Similarly, one of the beams in the reflected beam pair passes through a half-wave plate 36 that rotates its polarization by 90 degrees, so that the reflected beams become orthogonally polarized. These beams are recombined by the third beam displacer 37 into a single beam at output port B.

Figure 8:
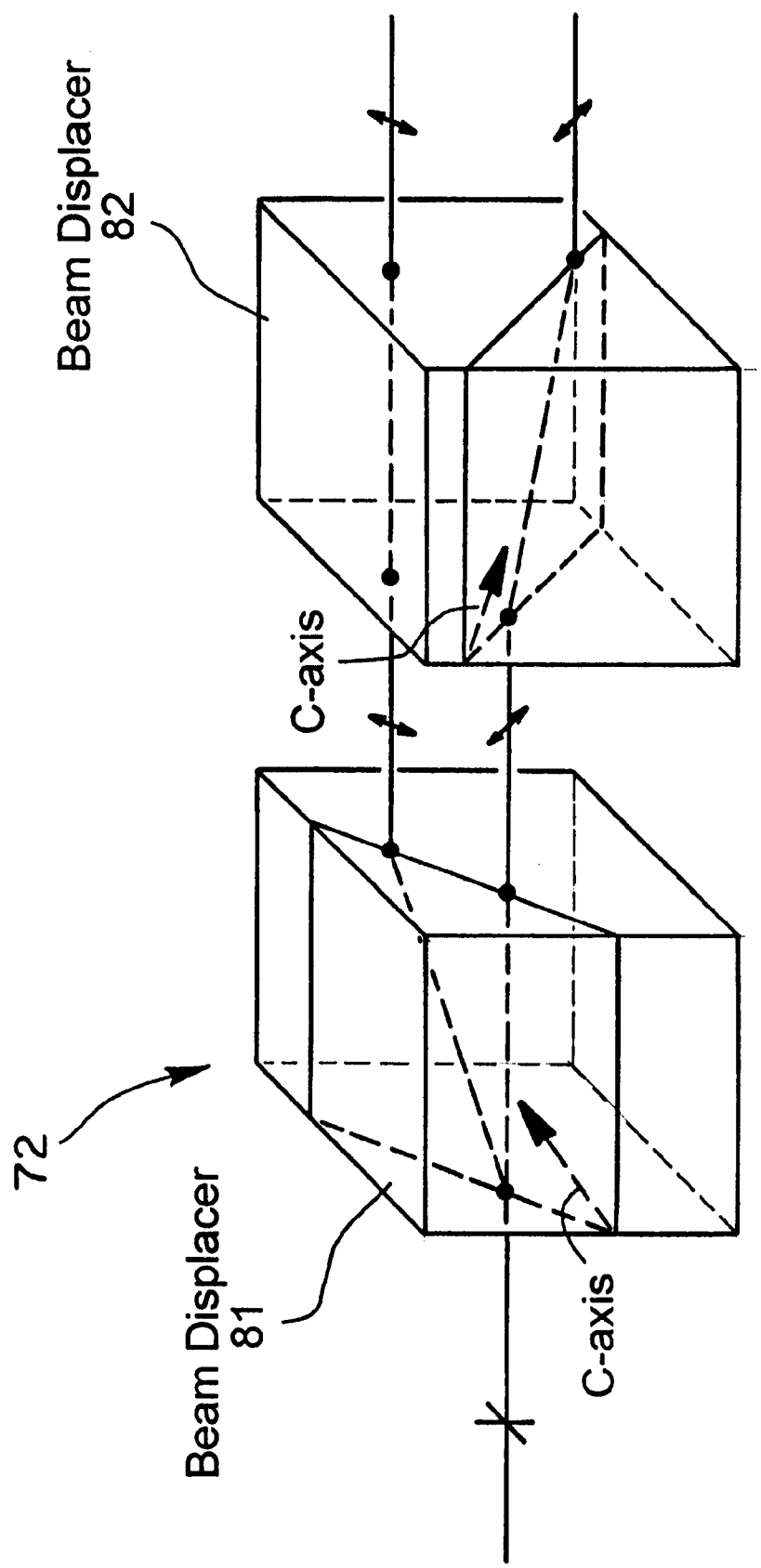
FIG. 8 is an isometric view of one embodiment of the zero-order beam displacer shown in FIG. 7

The second beam displacer 72 in FIG. 7 is preferably constructed as shown in greater detail in FIG. 8. Two beam displacers 81 and 82, made of similar materials and having similar thicknesses, are aligned so that their optical axes are 90 degrees relative to one another as shown in FIG. 8. The two beam displacers 81, 82 are then bonded together to form one piece. When an optical beam passes through this assembly, the two input polarizations are spatially separated, but there is no net difference in the optical path lengths through the beam displacers 81 and 82 between the two polarizations. In other words, FIG. 8 demonstrates a "pure" beam displacer (i.e., a zero-order beam displacer), in which the orthogonal input polarizations are spatially separated but at most only a negligible amount of birefringence is added to the beams.

Figure 9:
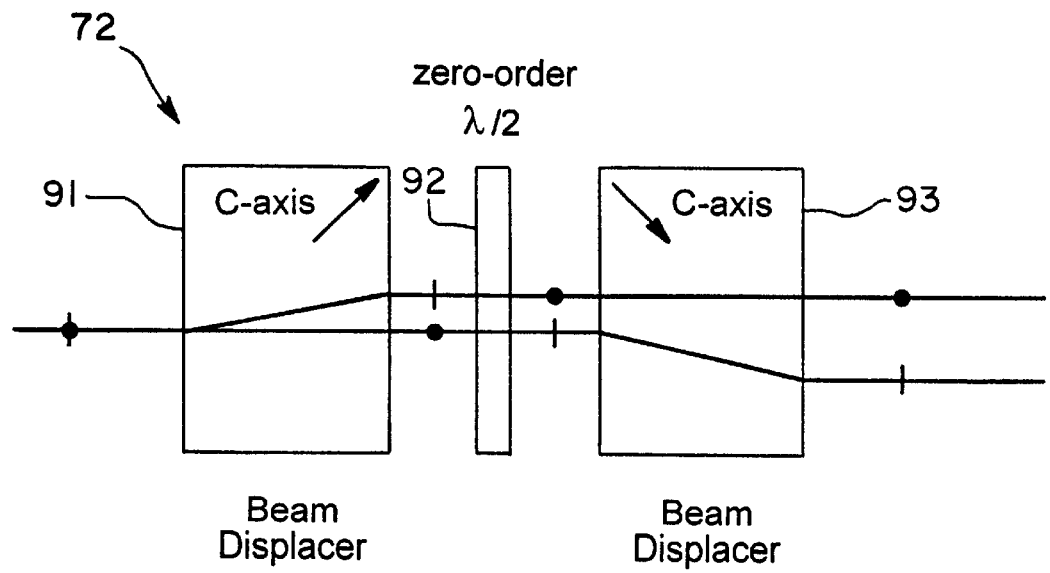
FIG. 9 is a side view of an alternative embodiment of the zero-order beam displacer shown in FIG. 7.
Figure 10:
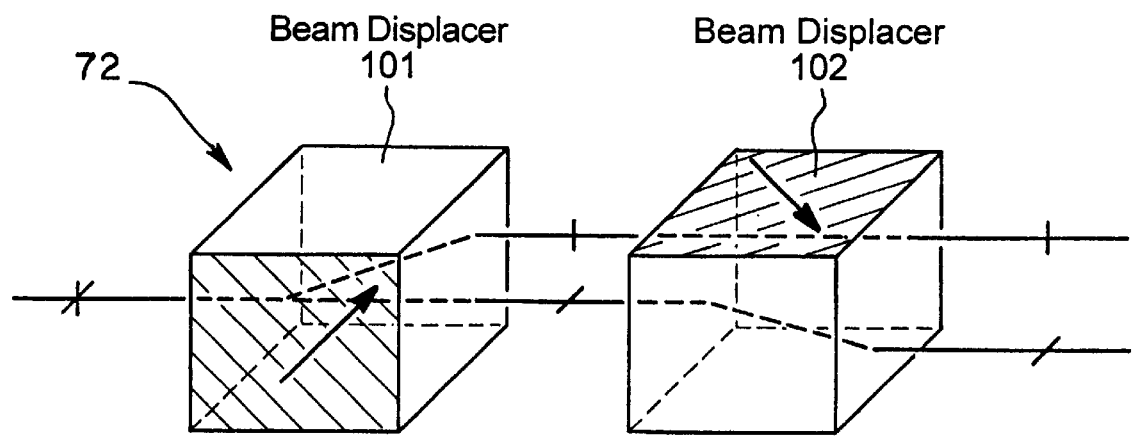
FIG. 10 is an isometric view of another alternative embodiment of the zero-order beam displacer shown in FIG. 7.

A zero-order beam displacer can also be implemented as depicted in FIG. 9. Here, a zero-order half-wave plate 92 is placed between beam displacers 91 and 93. The two displacers 91, 93 can be identical pieces but have their respective optical axes rotated 90 degrees from one another as shown in FIG. 9. FIG. 10 shows another arrangement to construct a zero-order displacer 72 with two identical pieces 101, 102 of conventional displacer using a different crystal orientation.

The embodiment illustrated in FIG. 7 is of practical importance because of the reduced difficulty of optical alignment. In general, either a waveplate or beam displacer can be used to generate birefringence in an optical beam. However, the birefringence of a conventional beam displacer is very sensitive to its orientation. To achieve a given amount of path delay between two polarizations, the position of a conventional displacer must be controlled to within very tight tolerances, making it difficult to initially align and to maintain proper alignment over a range of operating conditions, including temperature changes and mechanical vibration.

In contrast to a beam displacer, the amount of birefringence from a waveplate is much less sensitive to its orientation. There are two reasons for this difference in sensitivity. In a conventional beam displacer as used in FIG. 3, the optical beam usually propagates at about 45 degrees from the optical axis of the crystal. In this configuration, the index of refraction of the extraordinary beam is very sensitive to the exact angle between propagation direction and the optical axis. In a waveplate, the optical beam propagates at 90 degrees from the optical axis. In this configuration, the index of refraction of the extraordinary beam is relatively insensitive to the angle between the propagation direction and the optical axis. The second reason is that in a beam displacer, the ordinary and extraordinary rays exit the crystal with a spatial separation. When the crystal is tilted, the physical distance between the ordinary ray and the extraordinary ray travel become different. In contrast, the physical distances that the ordinary ray and extraordinary ray travel in a waveplates remain almost unchanged.

These two effects combine to make the embodiment of the present invention shown in FIG. 3 much more sensitive to the perturbations to the position of the beam displacer 34. In contrast, the implementation shown in FIG. 7 using waveplates 71 as the interferometer is very robust.

In addition to the advantages associated with waveplates 71, the zero-order displacer 72 introduces at most a negligible amount of birefringence and is therefore easy to initially align and to maintain alignment. In the device shown in FIG. 7, the waveplates 71 can be easily tuned to achieve a desire amount of birefringence and optical path length difference. Such a design makes it possible to produce a compact, reliable, and low-cost wavelength router for WDM communications. The zero-order displacer can further be used to implement a beam displacer with at most negligible inherent differential group delay (DGD). Such zero-DGD displacers also have zero polarization mode dispersion (PMD) and is a very important feature for a polarization-based wavelength router.

The above disclosure sets forth a number of embodiments of the present invention. Other arrangements or embodiments, not precisely set forth, could be practiced under the teachings of the present invention and as set forth in the following claims.

We claim:

1. An optical wavelength router comprising:
   a beam displacer separating an input beam into a first beam and second beam having orthogonal polarizations;
   a split-mirror resonator having:
   (a) a front mirror with a partially-reflective first region and a second region having a higher reflectivity than said first region; and
   (b) at least one reflective back mirror spaced a predetermined distance from said front mirror; wherein said first beam is incident on said first region, and said second beam is incident on said second region of said front mirror, so that portions of said first and second beams are reflected by said front mirror and the remainders of said first and second beams are transmitted through said front mirror and are reflected by said at least one reflective back mirror through said front mirror so that a group delay of said first and second beams are dependent on wavelength;
   a birefringent element combining and interfering said first and second beams reflected from said split-mirror resonator to produce a beam having mixed polarization as a function of wavelength;
   a polarization-dependent routing element separating polarized components of said mixed-polarization beam to produce two output beams containing complementary subsets of the spectrum of the input beam.

2. The optical wavelength router of claim 1 wherein said birefringent element comprises a beam displacer.

3. The optical wavelength router of claim 1 wherein said birefringent element comprises at least one waveplate.

4. The optical wavelength router of claim 1 wherein said polarization-dependent routing element comprises a polarized beamsplitter.

5. The optical wavelength router of claim 1 wherein said split-mirror resonator further comprises a plurality of reflective back mirrors arranged in a reflective ring behind said front mirror.

6. A method for optical wavelength routing predetermined complementary subsets of an optical spectrum in an input beam, said method comprising the steps of:
   separating an input beam into a first beam and second beam having orthogonal polarizations;
   providing a split-mirror resonator having:
   (a) a front mirror with a partially-reflective first region and a second region having a higher reflectivity that said first region; and
   (b) at least one reflective back mirror spaced a predetermined distance from said front mirror; wherein said first beam is incident on said first region and said second beam is incident on said second region of said front mirror, so that portions of said first and second beams are reflected by said front mirror and the remainders of said first and second beams are transmitted through said front mirror and are reflected by said at least one reflective back mirror through said front mirror so that a group delay of said first and second beams are dependent on wavelength;
   combining and interfering said first and second beams reflected from said split-mirror resonator to produce a beam having mixed polarization as a function of wavelength;
   separating polarized components of said mixed-polarization beam to produce two output beams containing complementary subsets of the spectrum of the input beam.

7. The method of claim 6 wherein said step of separating the input beam into said first and second beams is performed by a birefringent element.

8. The method of claim 6 wherein said step of separating polarized components of said mixed-polarization beam is performed by a polarized beamsplitter.

9. The method of claim 6 wherein said split-mirror resonator further comprises a plurality of reflective back mirrors arranged in a reflective ring behind said front mirror.

10. The method of claim 6 wherein said step of combining and interfering said first and second beams reflected from said split-mirror resonator is performed by a birefringent element.

11. An optical wavelength router comprising:
a beam displacer separating an input beam into a first beam and second beam having orthogonal polarizations;
a split-mirror resonator having:
(a) a front mirror with a partially-reflective first region and a second region having a higher reflectivity than said first region; and
(b) a reflective back mirror spaced a predetermined distance from said front mirror; wherein said first beam is incident on said first region and said second beam is incident on said second region of said front mirror, so that portions of said first and second beams are reflected by said front mirror and the remainders of said first and second beams are transmitted through said front mirror and are reflected by said at least one reflective back mirror through said front mirror so that a group delay of said first and second beams are dependent on wavelength;
a zero-order beam displacer combining said first and second beams reflected from said split-mirror resonator with only a negligible amount of birefringence added to said first and second beams;
at least one waveplate generating birefringence in the combined beam from said zero-order beam displacer, thereby providing a predetermined difference in optical path lengths between different polarized components of said combined beam to produce a beam having mixed polarization as a function of wavelength; and
a polarization-dependent routing element separating polarized components of said mixed-polarization beam to produce two output beams containing complementary subsets of the spectrum of the input beam.

12. The optical wavelength router of claim 11 wherein said zero-order beam displacer comprises:
a first birefringent element having its optical axis oriented in a predetermined direction; and
a second birefringent element having its optical axis oriented at approximately 90 degrees relative to the optical axis of said first birefringent element.

13. The optical wavelength router of claim 11 wherein said zero-order beam displacer comprises:
a first birefringent element having its optical axis oriented in a predetermined direction;
a second birefringent element having its optical axis oriented at approximately 90 degrees relative to the optical axis of said first birefringent element; and
a zero-order half-wave plate between said first and second birefringent elements.

14. An optical wavelength router comprising:
a first beam displacer separating an input beam into a pair of orthogonally-polarized beams;
a first polarization rotator rotating the polarization of at least one of said beams so that both beams have a first polarization;
a polarization-dependent routing element routing said beam pair along a predetermined optical path;
a birefringent element separating said beam pair into two pairs of orthogonally-polarized beams;
a split-mirror resonator having:
(a) a front mirror with a partially-reflective first region and a second region having a higher reflectivity that said first region; and
(b) a reflective back mirror spaced a predetermined distance from said front mirror; wherein two beams of said two pairs of orthogonally-polarized beams are incident on said first region, and the other two beams are incident on said second region of said front mirror, so that portions of said beam pairs are reflected by said front mirror and the remainders of said beam pairs are transmitted through said front mirror and are reflected by said back mirror through said front mirror so that a group delay of said beam pairs are dependent on wavelength;
wherein said beam pairs reflected by said split-mirror resonator interfere and combine within said birefringent element to produce two beams having mixed polarization as a function of wavelength;
wherein said polarization-dependent routing element separates polarized components of the mixed-polarization beams so that those components of said mixed-polarization beams having a first polarization are routed as a pair of beams along a first optical path toward said first polarization rotator and said first beam displacer, and those components of said mixed-polarization beams having a polarization orthogonal to said first polarization are routed as a pair of beams along a second optical path;
wherein said first polarization rotator rotates the polarization of at least one of said beam pair along said first optical path so that said beam pair becomes orthogonally polarized;
wherein said first beam displacer combines said orthogonally-polarized beam pair exiting said first polarization rotator to produce a first output beam containing a subset of the optical spectrum of the input beam;
a second polarization rotator rotating the polarization of at least one of said beam pair along said second optical path so that said beam pair becomes orthogonally polarized; and
a second beam displacer combining said orthogonally-polarized beam pair exiting said second polarization rotator to produce a second output beam containing a subset of the optical spectrum of the input beam.

15. The optical wavelength router of claim 14 wherein said birefringent element comprises at least one beam displacer.

16. The optical wavelength router of claim 14 wherein said birefringent element comprises at least one waveplate and a beam displacer.

17. The optical wavelength router of claim 16 wherein said beam displacer comprises a zero-order beam displacer.

18. The optical wavelength router of claim 14 wherein said polarization-dependent routing element comprises a polarized beamsplitter.

19. The optical wavelength router of claim 14 wherein said first polarization rotator comprises a half-wave plate.

20. The optical wavelength router of claim 14 wherein said second polarization rotator comprises a half-wave plate.

21. An optical wavelength router comprising:
a first beam displacer separating an input beam into a pair of orthogonally polarized beams;
a first polarization rotator rotating the polarization of at least one of said beams so that both beams have a first polarization;

a polarization-dependent routing element routing said beam pair along a predetermined optical path;

at least one waveplate producing orthogonally-polarized components in said beam pair;

a second beam displacer spatially separating the orthogonally-polarized components in said beam pair into two pairs of orthogonally-polarized beams;

a split-mirror resonator having:
   (a) a front mirror with a partially-reflective portion and a totally-reflective portion; and
   (b) a reflective back mirror spaced a predetermined distance from said front mirror, wherein two beams of said two pairs of orthogonally-polarized beams are reflected by said reflective portion of said front mirror, and the other two beams are transmitted through said partially-reflective portion of said front mirror and are reflected by said back mirror through said partially-reflective portion of said front mirror thereby providing a group delay that is dependent on wavelength;

wherein said second beam displacer combines said beam pairs reflected by said split-mirror resonator to produce two beams having mixed polarization that interfere within said waveplate to produce two beams having mixed polarization as a function of wavelength;

wherein said polarization-dependent routing element separates polarized components of the mixed-polarization beams so that those components of said mixed-polarization beams having a first polarization are routed as a pair of beams along a first optical path toward said first polarization rotator and said first beam displacer, and those components of said mixed polarization beams having a polarization orthogonal to said first polarization are routed as a pair of beams along a second optical path;

wherein said first polarization rotator rotates the polarization of at least one of said beam pair along said first optical path so that said beam pair becomes orthogonally polarized;

wherein said first beam displacer combines said orthogonally-polarized beam pair exiting said first polarization rotator to produce a first output beam containing a subset of the optical spectrum of the input beam;

a second polarization rotator rotating the polarization of at least one of said beam pair along said second optical path so that said beam pair becomes orthogonally polarized; and a third beam displacer combining said orthogonally-polarized beam pair exiting said second polarization rotator to produce a second output beam containing a subset of the optical spectrum of the input beam.

22. The optical wavelength router of claim 21 wherein said second beam displacer comprises a zero-order beam displacer.

23. The optical wavelength router of claim 21 wherein said polarization-dependent routing element comprises a polarized beamsplitter.

* * * * *